C. E. O. LANGLAIS.
SELF COUPLING FOR FLUID TRAIN LINES.
APPLICATION FILED DEC. 6, 1911.
1,092,061.
Patented Mar. 31, 1914.
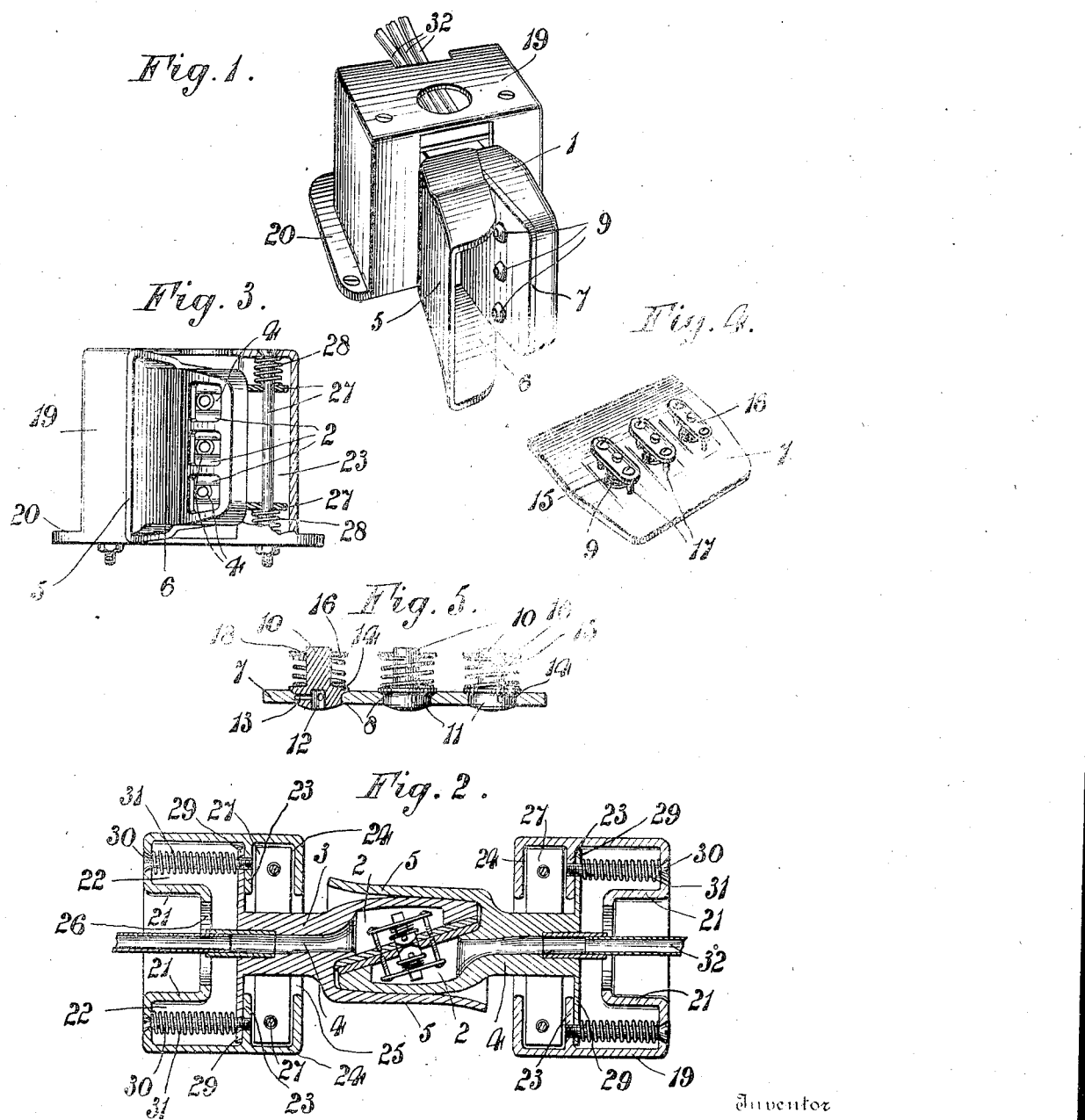

UNITED STATES PATENT OFFICE.

CHARLES EDOUARD OSCAR LANGLAIS, OF MONTREAL, QUEBEC, CANADA, ASSIGNOR OF SIXTEEN AND TWO-THIRDS ONE-HUNDREDTHS TO JOSEPH ANTOINE HILAIRE HEBERT, SIXTEEN AND TWO-THIRDS ONE-HUNDREDTHS TO CHARLES LELUAU, AND SIXTEEN AND TWO-THIRDS ONE-HUNDREDTHS TO LOUIS MARCEL LYM-BURNER, ALL OF MONTREAL, CANADA.

SELF-COUPLING FOR FLUID TRAIN-LINES.

1,092,061.          Specification of Letters Patent.     Patented Mar. 31, 1914.

Application filed December 5, 1911. Serial No. 664,084.

*To all whom it may concern:*

Be it known that I, CHARLES EDOUARD OSCAR LANGLAIS, a subject of the King of Great Britain, and resident of 386 Seigneur street, in the city and district of Montreal, Province of Quebec, Dominion of Canada, have invented certain new and useful Improvements in Self-Couplers for Fluid Train-Lines; and I do hereby declare that the following is a full, clear, and exact description of the same.

The invention relates to improvements in self couplers for fluid train lines, as described in the present specification and illustrated in the accompanying drawings that form part of the same.

The invention consists essentially in the novel construction and arrangement of parts, whereby the steam, air and other fluid lines are connected by the meeting of flexibly arranged jaws having valves extending through their faces, these valves controlling fluid lines.

The objects of the invention are to eliminate the use of hose couplings and to avoid the dangers incident to manually operating such couplings, and generally to devise a form of coupler automatic in its operation, simple in regard to its parts and economical in respect to its maintenance.

In the drawings, Figure 1 is a perspective view of one member of the coupler. Fig. 2 is a horizontal sectional view of the members in their coupled position. Fig. 3 is a front view of the coupler with the valve casing cover removed and the valve casing in section. Fig. 4 is a perspective detail, showing an inside view of the valve casing cover. Fig. 5 is an enlarged longitudinal sectional view of the valve casing cover.

Like numerals of reference indicate corresponding parts in each figure.

Referring to the drawings, and particularly to one member of the coupler, 1 is a valve casing having a plurality of interior chambers 2, said casing extending rearwardly and forming part of the shank 3, said shank having a corresponding number of passages 4 therethrough leading respectively to the interior chambers 2. 5 is an inwardly flanged guide member extending forwardly from said shank 3 and forming with said valve casing the pockets 6 adapted to receive the valve casing of the other member to the coupling.

7 is the cover of the valve casing 1, closing the interior chambers 2 and having holes 8 therethrough leading into said chambers.

9 are valves each formed with the stem 10 and the head 11, said head having the port 12 registering with the corresponding port in the other coupling member and the lateral port 13 leading into said port 12 and out through the side of the head. The head is flanged at 14 and abuts the inner side of the cover 7 around the hole 8, and therefore, in the extreme outer position of the valve 9, the port 13 is closed by the wall of the hole 8. 15 are springs, each of said springs encircling said stems 10 between the cover 7 and the plate 16 and retaining said valves in their outer position, except on the application of pressure on the heads 11.

The plates 16 are supported a short distance from the inside of the cover 7 by the posts or screws 17, but it must be understood that any suitable arrangement will do for this as said plates may be supported on rigid flanges from the inside of the cover, or may be themselves in the form of brackets, as long as the parts form a support for the inner ends of the stems 10 and allow a certain inward movement for said valves, as shown where the stems project through the holes 18.

It will now be seen that in corresponding coupler members, the jaws will meet, the valve casing in each instance entering pockets 6 and as the two covers 7 are brought to bear one on the other, the heads 11 which project outwardly from the cover in the form of a button, come in contact and press inwardly one on the other, with the result that the ports 12 register and the ports 13 are opened by the inward pressure which bring said ports 13 beyond the inner face of said cover, with the consequence that there are free and interrupted passages from the interior chambers of the one coupler member to the interior chambers of the other coupler member and through into the train lines.

19 are the bodies of the coupler members, each of said bodies having an outwardly extending flange 20 rigidly secured to the car body, inwardly extending flanges 21 from the rear side forming recesses 22, inwardly extending flanges 23 from the sides mid-way between the front of the body and said flanges 21 and forming recesses 24 and a central front opening 25 in alinement with the central rear opening 26 between the flanges 23.

27 are spring-held bars extending across within the interior of the body 19 into the recesses 24, one bearing against the upper side of the shank and the other bearing against the lower side thereof. 28 are springs at the ends of the bars 27, between said bars and said body, thus said bars are flexibly supported from the body.

29 are flanges extending outwardly from the inner end of the shank 3.

30 are pins extending from the flanges 23 into the recesses 22 and through the flanges 29, said flanges sliding readily on said pins. 31 are springs encircling the pins 30 between said flanges 29 and the rear walls of the recesses 22.

It will now be understood that the shank of the coupler member must be inserted through the openings 25 and 26 in order to bring the flanges 29 against the rear side of the side flanges 23, so that the pins 29 extend through said flanges. The result of this arrangement is that the flanges 29 are ordinarily held up tightly against the said side flanges 23 with the result that the coupler member is held to a forward position. The said shank 3 also passes between the bars 27, therefore, on every side said coupler member is flexible.

32 are flexible tubes secured to the inner end of the shank 3 and communicating with the ends of the passages 4 and at their other ends secured to the train line pipes.

What I claim as my invention is:

1. In a self coupler for fluid train lines, a pair of coupler members, a valve casing on the fore end of each coupler member, each of said members being formed with a shank integral with the valve casing and a guide piece flaring outwardly from said valve casing and forming therewith a pocket, a cover to said valve casing having holes therethrough, a valve having its stem extending into said valve casing and its head projecting outwardly from said cover, a bracket secured to the inside of said cover and through which said stem extends, a spring between said bracket and said cover and holding the head of said valve in its outward position and adapted to close a communicating port in said valve, a pair of bodies secured to the car bodies and flexibly supporting said shanks, flexible means of communication between shanks and the train lines adapted to connect said train lines with the valve chambers in said coupler members.

2. In a self coupler for fluid train lines, a pair of coupler members each of said members being formed of a pierced shank terminating at the front end thereof in a valve casing and a guide piece, said guide piece and said valve casing forming a pocket, a valve spring-held to its outer position and extending into said valve casing, a pair of bodies secured to the car bodies and having openings therethrough, each of said bodies having inwardly extending flanges forming rear and front recesses, a pair of bars engaging a shank on the upper and lower sides respectively and spring-held at their ends to the upper and lower sides of the body, flanged pieces extending laterally from said shanks to the rear of inwardly extending flanges in the body and springs extending into the rear recesses and flexibly holding said flanges from the shank in their forward position, and flexible means of communication from said shanks to the train lines.

Signed at the city of Montreal, Province of Quebec, Canada, this twenty-first day of November, 1911.

CHARLES EDOUARD OSCAR LANGLAIS.

Witnesses:
G. H. TRESIDDER,
P. A. SHEE.